United States Patent [19]

Minnich et al.

[11] 4,451,769

[45] May 29, 1984

[54] ELECTRONIC COMPENSATOR FOR AN ELECTROHYDRAULIC SERVOVALVE

[75] Inventors: George E. Minnich, Vestal; Clark L. Applegate, Binghamton, both of N.Y.

[73] Assignee: The Singer Company, Binghamton, N.Y.

[21] Appl. No.: 328,058

[22] Filed: Dec. 7, 1981

[51] Int. Cl.³ ............................................. G05D 17/00
[52] U.S. Cl. ..................................... 318/689; 318/611; 318/632
[58] Field of Search ....................... 318/611, 689, 632; 91/459

[56] References Cited

U.S. PATENT DOCUMENTS

| | | | |
|---|---|---|---|
| 3,051,883 | 8/1962 | Smith | 318/611 |
| 4,016,469 | 4/1977 | Lanni et al. | 318/689 |
| 4,051,423 | 9/1977 | Touchton et al. | 318/611 |
| 4,059,790 | 11/1977 | Kennel | 318/689 |
| 4,096,426 | 6/1978 | Tremaine et al. | 318/611 |
| 4,139,811 | 2/1979 | Klinger | 318/611 X |

Primary Examiner—B. Dobeck
Attorney, Agent, or Firm—Douglas M. Clarkson; Stephen C. Kaufman; Jeff Rothenberg

[57] ABSTRACT

Electronic compensation apparatus for modifying an input control signal, to produce a drive signal for a torque motor of an electrohydraulic servovalve. The torque motor has a frequency variable response characteristic. The apparatus includes means to determine a first voltage magnitude across the armature of the torque motor when it is not moving; means to determine a second voltage magnitude across the armature of the torque motor when it is moving; and means to determine a difference voltage of the first and second voltages. The difference voltage measures the dynamic motion of the armature and provides a feedback control signal. The apparatus further includes compensation means responsive to the feedback control signal for compensating the electrohydraulic servovalve so as to avoid resonance, and feedback means connected to the compensation means for providing a modified control signal.

7 Claims, 7 Drawing Figures

AN ILLUSTRATIVE MODEL OF A TWO-STAGE ELECTROHYDRAULIC SERVOVALVE

ELECTRONIC COMPENSATOR FOR AN ELECTROHYDRAULIC SERVOVALVE

TECHNICAL FIELD

The present invention relates to electrohydraulic servovalves and more particularly relates to electronic compensation apparatus for a torque motor associated with an electrohydraulic servovalve.

BACKGROUND ART

An electrohydraulic servovalve is a servomechanism or control device that can develop a large amount of hydraulic power from a small input electrical signal. A brief description of the operation of an electrohydraulic servovalve is helpful in attaining an appreciation of its desirable response characteristics.

A typical two-stage electrohydraulic servovalve 10 is shown in FIG. 1 and includes two important components: a hydraulic spool valve 12 and a torque motor 14. As shown, the spool valve 12 regulates flow of hydraulic fluid, for example oil, to either side of a main cylinder 16. An input motion to the spool valve of a few thousandths of an inch results in a large change of oil flow. The resulting difference in pressure on a piston 18 causes motion of an output shaft 20.

The input motion to the spool valve is provided by the torque motor 14 in the following manner. Associated with the armature 22 of the torque motor is a flexure tube or spring (not shown) which functions, in part, to isolate a drive arm 24 from the oil. In response to an electrical drive signal supplied as an input to the torque motor, the motor developes a force or torque which is transmitted from the armature 22, through the spring, to the drive arm 24. This action in turn results in an input motion to the valve 12.

The desired response characteristics of an electrohydraulic servovalve that operates in accordance with this description includes the characteristics that the force or torque developed by the motor should be very nearly proportional to the electrical drive signal, and that the dynamic response of the drive arm to the electrical drive signal be as rapid as possible. In this manner, it is possible to have accurate control of the position of the drive arm.

Electrohydraulic servovalves that provide response characteristics that approximate these desired characteristics are commercially available. However, in order to realize these desired response characteristics, the servovalve should be employed under certain operating conditions. For example, with the electrohydraulic servovalve of the type available from Pegasus Laboratory, Inc. of Troy, Mich., the desired characteristics are approximately realized if the electrohydraulic servovalve is relatively small, i.e. if the rated flow GPM (gallons per minute) is approximately 0–3 GPM, and if the electrical drive signal supplied as an input to the motor has a relatively narrow frequency band, e.g. from approximately 0 to 1000 hz.

The reason for the indicated limitations on size and frequency range is explained hereinafter. In general, the electrohydraulic servovalve may be modelled as a mechanical spring-mass-damper system. In this model, the flexure tube corresponds to the spring, the mass of the armature and drive arm corresponds to the mass of the system, and the hydraulic fluid corresponds to the damper. The spring-mass-damper system has an associated natural frequency ($\omega_n$) that is inversely proportional to the mass (m) of the system, i.e. $\omega_n \alpha 1/m$.

When the frequency of the drive signal is substantially the same as the natural frequency, the torque motor goes into resonance. Effectively, at this resonant frequency, the torque developed by the motor is not proportional to the drive signal. At the resonant frequency, consequently, the electrohydraulic servovalve does not provide the desired response characteristics.

Since the natural frequency is inversely proportional to the mass of the system, it is clear that, as the mass of the system becomes larger, the natural frequency correspondingly becomes smaller. Therefore, for this system, it is necessary to reduce the band of frequencies associated with the input electrical drive signal to the torque motor, in order to avoid the resonant condition.

However, in state of the art employments for electrohydraulic servovalves, for example in the field of flight simulation, there is a need for an electrohydraulic servovalve that has a relatively large mass and is also capable of handling a relatively broad band of input electrical drive signal frequencies, without going into resonance. Electrohydraulic servovalves that are now commercially available do not adequately fulfill this need.

The present invention provides an electrohydraulic servovalve with associated electronic compensation apparatus that addresses the cited difficulties and fulfills this need. The present invention may, for example, be advantageously employed with electrohydraulic servovalves that have a relatively large mass (e.g. greater than 3 GPM rated flow) and are driven by input electrical drive signals having a broad band of frequencies (e.g. 0–10,000 hz). The associated electronic compensation apparatus ensures that the torque motor of the electrohydraulic servovalve will not go into resonance under such operating conditions.

DISCLOSURE OF THE INVENTION

Accordingly, an object of the present invention is to provide compensation apparatus for an electrohydraulic servovalve that enables relatively large size electrohydraulic servovalves to be driven by input electrical drive signals having a broad band of frequencies.

Another object of the present invention is to enable large size electrohydraulic servovalves to be operated without going into resonance.

In accordance with the present invention, an apparatus is provided that modifies an input control signal, to produce a drive signal that controls a driveable physical element which has a frequency variable response characteristic. The apparatus includes means to provide a feedback control signal that corresponds to the dynamic motion of the physical element. Also included are compensation means responsive to the feedback control signal which compensates the physical element so as to avoid resonance. The apparatus further includes feedback means connected to the compensation means for producing a modified control signal.

BRIEF DESCRIPTION OF THE DRAWINGS

These and other features of the present invention will be more clearly understood from a consideration of the following description taken in connection with the accompanying drawings in which.

BEST MODE FOR CARRYING OUT THE INVENTION

Figure 1:
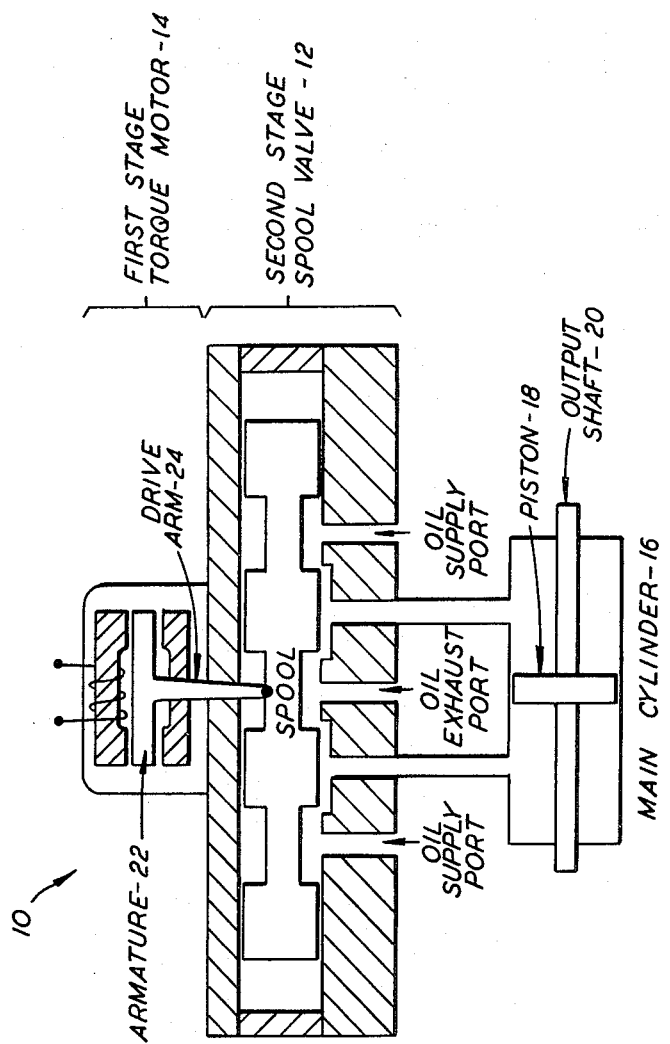
FIG. 1 illustrates a typical two-stage electrohydraulic servovalve.
Figure 2:
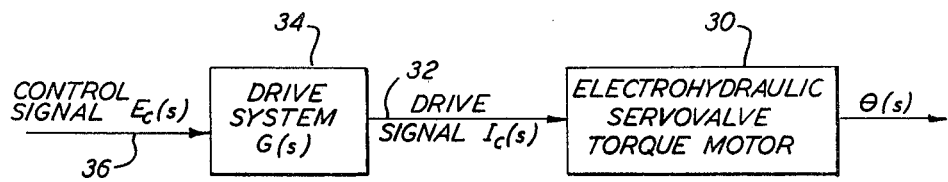
FIG. 2 shows a block diagram of an electrohydraulic servovalve without the compensation apparatus of the present invention.

Reference is now made to FIG. 2 which shows a block diagram of an electrohydraulic servovalve torque motor 30, without the electronic compensation apparatus of the present invention. As shown in FIG. 2, the torque motor 30 is driven by an electrical drive signal 32 which is produced by a drive system 34. The system 34, in turn, is dependent upon an input control signal 36.

Also shown in FIG. 2 are the Laplacian functions $E_c(s)$, $G(s)$, $I_c(s)$ and $\theta(s)$ which are defined in a conventional manner, well known in the art. Thus, $E_c(s)$ is a voltage function that corresponds to the input control signal 36; $G(s)$ is the gain or transfer function of the drive system 34; $I_c(s)$ is a current function that corresponds to the electrical drive signal 32; and $\theta(s)$ is a position function that corresponds to the angular position of the armature of the torque motor. The angular position $\theta(s)$ is ideally related to the current function $I_c(s)$ by the equation $\theta(s) = k_t I_c(s)$, where $k_t$ is a torque constant of the torque motor.

Figure 3:
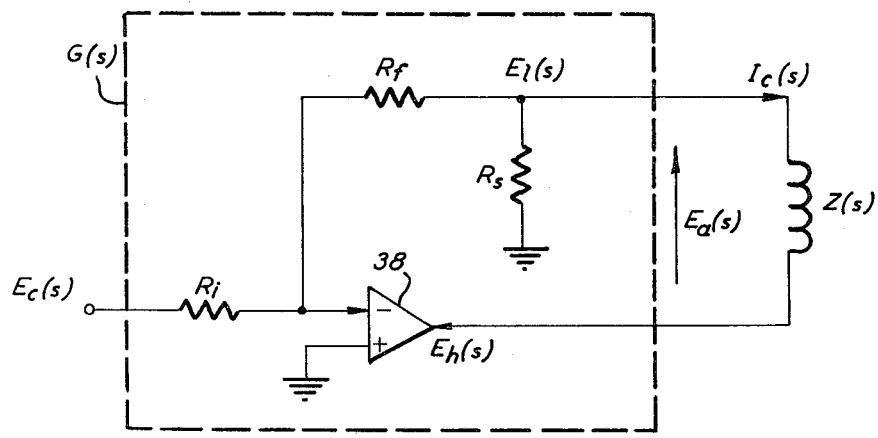
FIG. 3 is a circuit diagram that provides electronic hardware to implement the block diagram of FIG. 2.

FIG. 3 corresponds to FIG. 2 and shows electronic hardware that may be used to develop the identified Laplacian functions. In particular, the drive system 34 includes a conventional operational amplifier 38 connected in a circuit with an input resistor $R_i$, a feedback resistor $R_f$, and a sampling resistor $R_s$. The transfer function of the drive system 34 is expressed as $$G(s) = \frac{R_f}{R_i R_s} \qquad (1)$$

The drive system 34 functions to ensure that the electrical drive signal 32, identified as the current function $I_c(s)$, is proportional to the input control signal 36, here shown as the voltage function $E_c(s)$ (i.e. $I_c(s) = G(-s)E_c(s)$). To this end, the amplifier 38 forces the output voltage $E_h(s)$ (where the subscript h refers to the voltage of the "high" side of the armature of the torque motor) to be whatever magnitude is required, within the limits of the amplifier, in order to provide a constant $I_c(s)$ drive signal which is proportional to the input control signal $E_c(s)$ (i.e. $I_c(s) = G(s)E_c(s)$).

Also shown in FIG. 3 are the Laplacian functions $E_l(s)$, $E_a(s)$ and $Z(s)$. These functions are defined as follows: $E_l(s)$ is the voltage of the "low" side of the armature of the torque motor; $E_a(s)$ is the input voltage to the armature of the torque motor and may be expressed by the function $E_a(s) = E_h(s) - E_l(s)$; and $Z(s)$ is the impedance function of the armature of the torque motor and is related to the drive signal by Ohm's law $$I_c(s) = \frac{E_a(s)}{Z(s)}. \qquad (2)$$

The operation of the electrohydraulic servovalve of FIGS. 2 and 3 therefore includes providing the electrical drive signal $I_c(s)$ as an input to the armature of the torque motor which has an impedance $Z(s)$. It is observed that both $I_c(s)$ and $Z(s)$ are frequency dependent, since, by definition of the complex Laplacian operator s, $s = j\omega$, where $\omega$ is frequency in radians/second and $j = \sqrt{-1}$. The operation of the electrohydraulic servovalve is therefore frequency dependent. The nature of this frequency dependency is twofold, since the impedance function $Z(s)$ has associated natural complex frequencies corresponding to free oscillations, and, the electrical drive signal function $I_c(s)$ has associated driving-force complex frequencies corresponding to forced oscillations. As developed above, moreover, the torque motor goes into resonance when the driving-force complex frequencies are substantially the same as the natural complex frequencies.

Figure 4:
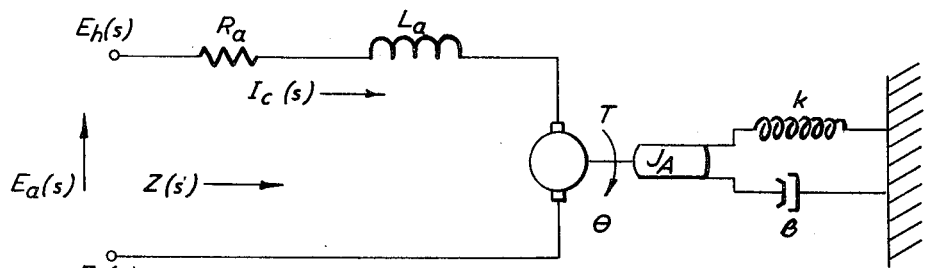
FIG. 4 shows a model of the armature of the torque motor having an impedance Z(s)

The dependency of the operation of the electrohydraulic servovalve on the natural and driving-force frequencies may be shown analytically be deriving the impedance function $Z(s)$. Reference is now made, therefore, to FIG. 4 which is a model of the armature of the torque motor having an impedance $Z(s)$. In this model, the flexure tube corresponds to the spring which has an elastance coefficient k; the mass of the armature and drive arm is represented by the symbol $J_a$; and the hydraulic fluid is represented by the viscous damping coefficient B. $Z(s)$ may be derived by applying Kirchoff's and Newton's laws to the model, and then applying the Laplace transformation to the resulting integrodifferential equations.

Accordingly, for this model, Kirchoff's voltage law requires $$E_a = (R_a + L_a s)I_c(s) + K_e s\, \theta(s) \qquad (3);$$

and Newton's laws requires that $$T(s) = (J_a s^2 + Bs + k)\theta(s) \qquad (4)$$

and $$T(s) = k_t I_c(s) \qquad (5)$$

where
$R_a$ = resistive component of the armature winding
$L_a$ = inductive component of the armature winding
$K_e$ = back emf coefficient of the torque motor
$T$ = torque produced by the torque motor By substituting equation (5) into equation (4) and simplifying, we arrive at equation (6), which expresses the angular position function $\theta(s)$:

$$\theta(s) = \frac{k_t I_c(s)}{(J_a s^2 + Bs + k)}. \qquad (6)$$

Next, by substituting equation (6) into equation (3) we arrive at equation (7)

$$E_a(s) = (R_a + L_a s)I_c(s) + \left( \frac{k_e s k_t I_c(s)}{J_a s^2 + Bs + k} \right). \quad (7)$$

Finally, by dividing equation (7) by $I_c(s)$, we can show that the impedance function $$Z(s) = \frac{E_a(s)}{I_c(s)} = (R_a + L_a s) + \left( \frac{(k_e k_t s)}{J_a s^2 + Bs + k} \right). \quad (8)$$

In general, the impedance function $Z(s)$ includes an inductive reactance portion $(R_a + L_a s)$ and a mechanical reactance portion $$\left( \frac{(k_e k_t s)}{(J_a s^2 + Bs + k)} \right).$$

The natural frequency associated with this impedance function $Z(s)$ is expressed by $$\omega_n = \sqrt{\frac{k}{J_a}}.$$

By inspection of the impedance function $Z(s)$ (equation (8)), it is observed that when the band of input frequencies of the drive signal $I_c(s)$ are relatively low $(s=j\omega \to 0)$ the impedance $Z(s)$ is relatively small and equal to $R_a$. Furthermore, by inspection of the angular position function $\theta(s)$, equation (6), it is observed that the desired proportionality of $\theta(s)$ and $I_c(s)$ is also obtained for small values of input drive signal frequencies (i.e. $\theta(s) = k_t I_c(s)$).

As the band of input frequencies of the drive signal $I_c(s)$ increases, however, $(\omega >> 0)$ so that the driving force frequencies approach the natural frequency $\omega_n$ of the impedance function $Z(s)$, the magnitude of the impedance function $Z(s)$ becomes greater and greater. In particular, the magnitude of the mechanical reactance portion of the impedance function $Z(s)$ substantially increases. This increase in turn effects the angular position function $\theta(s)$, so that $\theta(s)$ is no longer proportional to $I_c(s)$ $$\left( \text{i.e. } \theta(s) = \frac{k_t I_c(s)}{J_a s^2 + Bs + k} \right).$$

For this condition of input drive frequencies in the neighborhood of $\omega_n$, $I_c(s)$ should be decreasing in such a proportion that $\theta(s)$ is continuously related to $I_c(s)$ by a constant (i.e. $\theta(s) = k_t I_c(s)$). However, for the electrohydraulic servovalve of FIGS. 2-4, $I_c(s)$ remains proportional to $E_c(s)$ even as the input frequency of $I_c(s)$ approaches $\omega_n$. The drive system 34 always attempts to maintain the constantness of $I_c(s)$ to $E_c(s)$ by supplying an ever increasing magnitude of $E_h(s)$. In fact, the drive system 34 increases the magnitude $E_h(s)$ until the saturation limits of the operational amplifier 38 are met. At no time, however, does this electrohydraulic servovalve operate to decrease the magnitude of $I_c(s)$ in the neighborhood of the resonant frequency.

Figure 5:
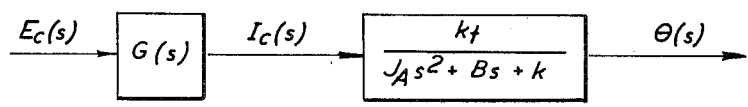
FIG. 5 provides details of an open loop block diagram of a two-stage electrohydraulic servovalve torque motor without the compensation apparatus of the present invention.

In summary, as can be observed in FIG. 5, there is no compensation apparatus in the open loop block diagram of this two-stage electrohydraulic servovalve torque motor that can correct or compensate for the resonant condition. In particular, there is no feedback compensation apparatus associated with the transfer block $$\frac{\theta(s)}{I_c(s)} = \frac{k_t}{J_a s^2 + Bs + k},$$

which can reduce the magnitude of $I_c(s)$ in the neighborhood of $\omega_n$. Consequently, for the electrohydraulic servovalve of FIG. 5, there are limits on its relative size (as measured by $J_a$) and on the range of input frequencies of the driving signal $I_c(s)$.

Figure 6:
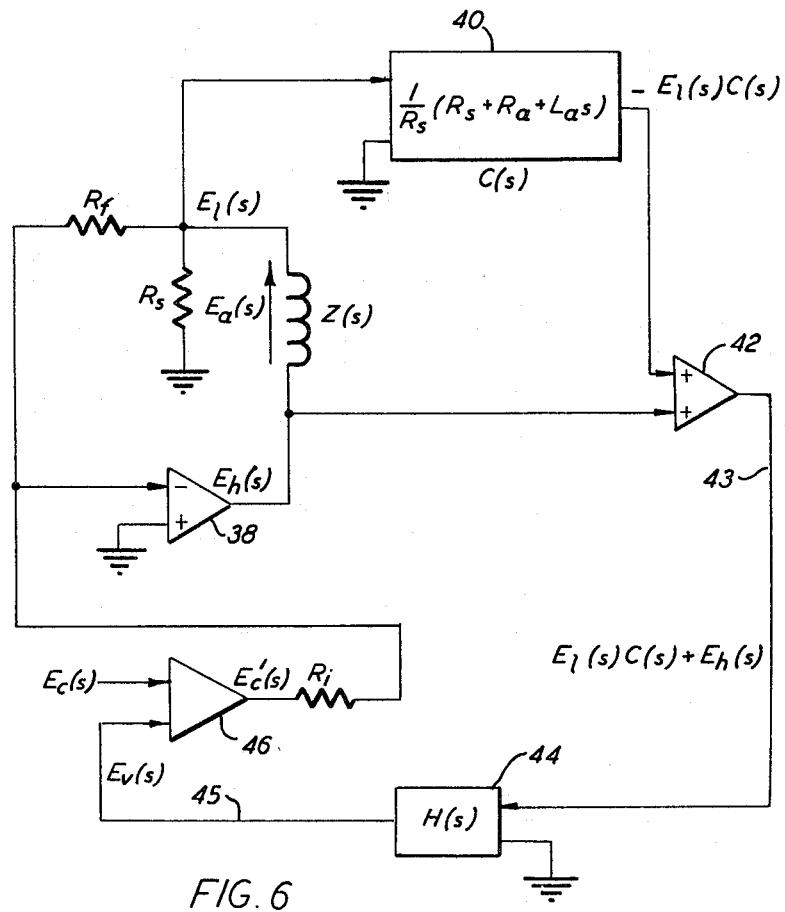
FIG. 6 is a circuit diagram showing the compensation apparatus of a preferred embodiment of the present invention.

It is at this point that the present invention provides novel compensation apparatus that enables relatively large, two-stage electrohydraulic servovalves to be driven by input electrical drive signals having a relatively broad range of frequencies, without going into resonance. The compensation apparatus is shown in FIG 6.

By comparing FIG's. 6 and 3, it is observed that the compensation apparatus of a preferred embodiment of the present invention provides a closed feedback loop to the open loop apparatus of FIG. 3. The closed feedback loop includes the addition of a conventional operational amplifier 40. The voltage input to the amplifier 40 is connected to the low side ($E_1(s)$) of the armature of the torque motor. The amplifier 40 has an associated gain function $$C(s) = \frac{1}{R_s} (R_s + R_a + L_a s). \quad (9)$$

where $C(s)$ represents the inductance reactance of the torque motor. The voltage output of the amplifier 40 is expressed as $-E_1(s) C(s)$, and this voltage output is, in turn, a first input to a conventional summing amplifier 42.

The summing amplifier 42 is also provided with a second voltage input $E_h(s)$, which corresponds to the voltage of the high side of the armature. The sum of the first and second inputs corresponds to a feedback control signal 43 and is expressed as $-E_1(s)C(s) + E_h(s)$.

The compensation apparatus also includes a conventional operational amplifier 44 that has a associated gain function $H(s)$. The input to the amplifier 44 is the output of the amplifier 42, that is, the feedback control signal 43 which is the sum of $-E_1(s)C(s) + E_h(s)$. The output of the amplifier 44, in turn, is expressed as $$[-E_1(s)C(s) + E_h(s)]H(s) = E_v(s)$$

where the function $E_v(s)$ represents the movement (v) of the armature of the torque motor. The function $E_v(s)$ is further identified in FIG. 6 as the command signal 45.

The command signal 45 is provided as a first input to a conventional operational amplifier 46. The amplifier 46 is so positioned that it closes the feedback loop, since it sums the command signal 45 with the input control signal $E_c(s)$, to produce a modified control signal $E'_c(s)$.

In summary, the compensation apparatus of FIG. 6 provides a determination of the magnitude of the voltage across the armature when it is not moving (i.e.

$E_1(s)C(s))$ a determination of the magnitude of the voltage across the armature when it is moving (i.e. $E_h(s)$), and a determination of the voltage magnitude that corresponds to the dynamic motion of the armature (i.e. $E_h(s) - E_1(s)C(s)$). The dynamic motion of the armature is defined as the feedback control signal 43 and is expressed as $$E_h(s) - E_1(s)C(s) = I_c(s)\left(\frac{k_e k_f s}{J_a s^2 + Bs + k}\right). \tag{10}$$

The inventors have discovered that by suitably adjusting the gain function H(s), the resonant problem can be solved. This follows from the following considerations. First, it is observed that the feedback control signal 43, multiplied by H(s), is expressed as $$E_v(s) = H(s)I_c(s)\left(\frac{k_e k_f s}{J_a s^2 + Bs + k}\right). \tag{11}$$

Therefore, adjustments to H(s) directly effect $E_v(s)$. Changes to $E_v(s)$, in turn, effect the input control signal, since a new or modified control signal $E_c'(s)$ is inputted to the drive system, and not the input control signal $E_c(s)$. This modified control signal is expressed as $E_c'(s) = E_c(s) - E_v(s)$. The drive system therefore operates in a manner developed above, to produce a drive signal $I_c(s) = G(s)E_c'(s)$. Since the magnitude of $E_c'(s)$ is reduced from the magnitude of $E_c(s)$ by a factor of $E_v(s)$, it is possible to control $I_c(s)$ in the neighborhood of $\omega_n$ (through the equation $I_c(s) = G(s)E_c'(s)$), by controlling H(s) (i.e. by controlling $E_v(s)$ through H(s)).

Figure 7:
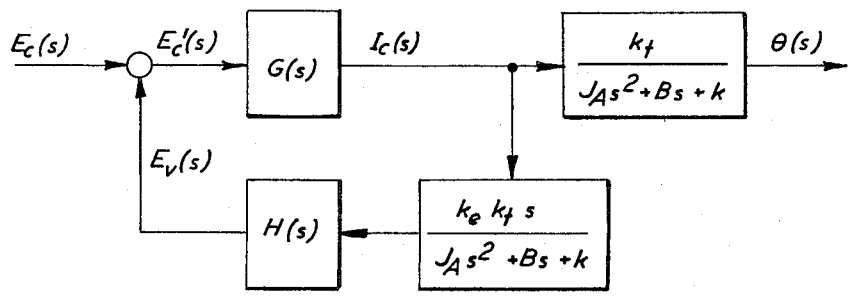
FIG. 7 shows a feedback control diagram that corresponds to the circuit diagram of FIG. 6.

It has been established, therefore, that suitable adjustments of H(s) can control the resonance problem. An understanding of the particular nature of these adjustments of H(s) is facilitated by reference to FIG. 7, which shows a feedback control diagram of the apparatus of FIG. 6. H(s) may be isolated for study in FIG. 7, by first forming the transfer function $[\theta(s)]/[E_c(s)]0$ which defines the relationship of the angular position of the armature of the torque motor $\theta(s)$ to the input control signal $E(s)$. Hence, $$\theta(s) = \frac{I_c(s)}{E_c(s)} \cdot \frac{\theta(s)}{I_c(s)}$$

$$= \frac{G(s)}{J_a s^2 + Bs + k + G(s)H(s)k_e k_f s} = k_t$$

$$= \frac{G(s)k_t}{J_a s^2 + Bs + k + G(s)H(s)k_e k_f s}$$

Since $$G(s) = \frac{R_f}{R_i R_s} = G \text{ (constant)},$$

$$\frac{\theta(s)}{E_c(s)} = \frac{k_t}{J_a s^2 + Bs + k + G(s)H(s)k_e k_f s}$$

It may be observed from equation (12) that H(s) is embedded in the denominator of the transfer function $[\theta(s)]/[E_c(s)]$. As is well known in the art (see, for example D'Azzo and Houpis in "Feedback Control System Analysis and Synthesis", McGraw-Hill, 1966, Chapters 3 and 11), this transfer function defines a second order system. A second order system (without compensation) is characterized by the following properties. First, the undamped natural frequency $\omega_n$ is expressed as $$\omega_n = \sqrt{\frac{k}{J_a}}. \tag{13}$$

Second, the damping ratio $\rho$ is expressed as $$\rho = \frac{B}{2\sqrt{J_a k}}. \tag{14}$$

Third, the resonant frequency $\omega_r$ is expressed as $$\omega_r = \omega_n \sqrt{1 - 2\rho^2} \tag{15}$$

In order to avoid the resonant condition of equation (15), H(s) is adjusted to change either the damping ratio $\rho$, or the undamped natural frequency $\omega_n$. These alternative changes to H(s) are now derived. In brief, the damping ratio $\rho$ may be changed if H(s) becomes a constant (i.e. if H(s) is not frequency dependent). This conclusion follows from the following analysis.

First, equation (12) is manipulated so that it is of the form $$\frac{\theta(s)}{E(s)} = \frac{\frac{k}{k} \cdot \frac{k_t}{J_a}G}{s^2 + \frac{Bs}{J_a} + \frac{k}{J_a} + \frac{GH(s)k_e k_f s}{J_a}} \tag{16}$$

$$= \frac{\frac{\omega_n^2 k_t G}{k}}{s^2 + \frac{Bs}{J_a} + \frac{k}{J_a} + \frac{GH(s)k_e k_f s}{J_a}}$$

$$= \frac{\frac{\omega_n^2 k_t G}{k}}{s^2 + 2\rho\omega_n s + \omega_n^2 + \frac{GH(s)k_e k_f s}{J_a}}$$

$$= \frac{\frac{\omega_n^2 k_t G}{k}}{s^2 + \left[2\rho\omega_n + \left(\frac{GH(s)k_e k_t}{J_a}\right)\right]s + \omega_n^2}.$$

Second, H(s) is made a constant so that equation (16), as modified becomes $$\frac{\theta(s)}{E_c(s)} = \frac{\frac{\omega_n^2 k_t G}{k}}{s^2 + \left[2\rho\omega_n + \frac{GHk_e k_t}{J_a}\right]s + \omega_n^2} \tag{17}$$

$$= \frac{\frac{\omega_n^2 k_t G}{k}}{s^2 + 2\omega_n\left[\rho + \frac{GHk_e k_t \omega_n}{2k}\right]s + \omega_n^2}.$$

By inspection, therefore, of equation (17), it is clear that the resonant condition can be avoided by increasing the magnitude of H until the quantity $$\left[ p + \frac{GHk_e k_t \omega_n}{2k} \right]$$

approaches one (by definition, the magnitude of $p$ for which a second-order system is critically damped and therefore non-oscillatory).

As indicated above, the resonant condition is also avoided by changing $\omega \eta$. This requires that $H(s)$ become frequency dependent in a form expressed by equation (18)

$$H(s) = \frac{K_h(1 + Ts)}{s} \quad (18)$$

where $K_h$ is defined as the gain or magnitude of $H(s)$ and T is a time constant of the numerator. By substituting equation (18) into equation (16) and re-arranging, equation (19) is thereby derived:

$$\frac{\theta(s)}{E_c(s)} = \frac{\frac{\omega_n^2 k_t G}{k}}{s^2 + \left(2p\omega_n + \frac{Gk_h T k_e k_t}{Ja}\right) s + \frac{\omega_n^2 + Gk_h k_e k_t}{Ja}} \quad (19)$$

By inspection of equation (19), it is clear that by adjusting the gain $k_h$ and time constant T of $H(s)$, the damping ratio and undamped natural frequency can be made to any desired value.

The derivation of the transfer functions expressed in equations (19) and (17) is based on the circuit diagram of FIG. 6. Other circuit diagrams having the same transfer functions are conceivable. Well known technologies exist in the control system and electronics art for the construction of circuits having desired system transfer functions. It is believed that the circuit diagram of FIG. 6 is an optimal implementation of such transfer functions and is therefore preferred. However, it is intended that all such circuits which have frequency domain transfer functions corresponding to those indicated above, fall within the scope of the present invention.

The present invention, in summary, may be employed to improve the response characteristics of an electrohydraulic servovalve. Although specific embodiments of the present invention have been described herein, it will be obvious to those skilled in the art that various modifications may be made without departing from the spirit of the invention. For example, the compensation apparatus may be employed with any physical element whose defining parameters are in correspondance with those of a two-stage electrohydraulic servovalve. With the foregoing in mind, it is understood that the invention is intended to be limited solely by the appended claims.

We claim:

1. Apparatus for modifying an input control signal to produce a drive signal controlling a driveable physical element in the form of a servo-valve driven by a torque motor having a frequency variable response characteristic, comprising:
    means to provide a feedback control signal that corresponds to the dynamic motion of said physical element and that includes means to determine a difference voltage between a first voltage across the armature of said torque motor when it is moving and a second voltage when it is not moving;
    compensation means responsive to said feedback control signal for compensating said element so as to avoid resonance of said element; and
    feedback means connected to said compensation means for producing a modified control signal.

2. The apparatus of claim 1, wherein said driveable physical element is a electrohydraulic servovalve having a resonant frequency which varies as a function of the mass, the elastance and the damping coefficient of the torque motor of the electrohydraulic servovalve.

3. Apparatus for modifying an input control signal to produce a drive signal for controlling the torque motor of an electrohydraulic servovalve having a frequency variable response characteristic, comprising;
    (a) means to determine a first voltage magnitude across the armature torque motor when it is not moving;
    (b) means to determine a second voltage magnitidue across the armature torque motor when it is not moving;
    (c) means to determine a difference voltage of said first and second voltage magnitude, said difference voltage being the measure of the dynamic motion of said armature and corresponding to a feedback control signal;
    (d) compensation means responsive to said feedback control signal for compensating said torque motor so as to avoid resonance of said torque motor; and
    (e) feedback means connected to said compensation means for producing a modified control signal.

4. The apparatus of claim 1 or 3, wherein saidcompensation means comprises multiplying feedback means responsive to said feedback control signal, for multiplying said feedback control signal by a transfer function that is dependent on the damping ratio and undamped natural frequency of the torque motor, for producing a command signal.

5. The apparatus of claim 4 wherein the damping ratio of said torque motor is controlled by adjusting the magnitude of said transfer function, wherein said transfer function is not frequency dependent.

6. The apparatus of claim 5 wherein the undamped natural frequency and the damping ratio of said torque motor is controlled by adjusting the gain and time constant of said transfer function.

7. The apparatus of claim 6 wherein the feedback means connected to said compensation means includes summing means for summing said control signal with said command signal to produce said modified control signal.

* * * * *